J. McGOWAN.
VEHICLE-WHEEL.

No. 189,318. Patented April 10. 1877.

Witnesses.
Robert S. Sill
Geo. C. Stewart

Inventor.
John McGowan
per Josiah W. Ells
Attorney

UNITED STATES PATENT OFFICE.

JOHN McGOWAN, OF MIFFLIN TOWNSHIP, ALLEGHENY COUNTY, PA.

IMPROVEMENT IN VEHICLE-WHEELS.

Specification forming part of Letters Patent No. 189,318, dated April 10, 1877; application filed March 15, 1877.

*To all whom it may concern:*

Be it known that I, JOHN MCGOWAN, of Mifflin township, in the county of Allegheny and State of Pennsylvania, have invented a new and Improved Wheel for Vehicles, which invention will be readily understood from the following description, taken in connection with the accompanying drawings, wherein—

Figure 1:
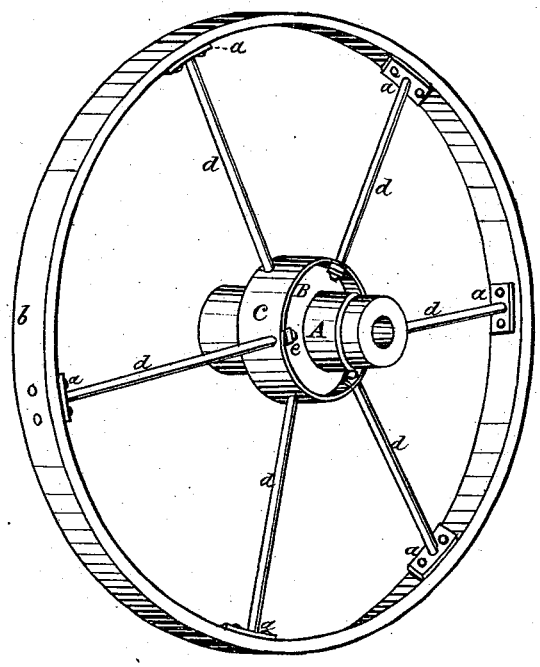
Figure 2:
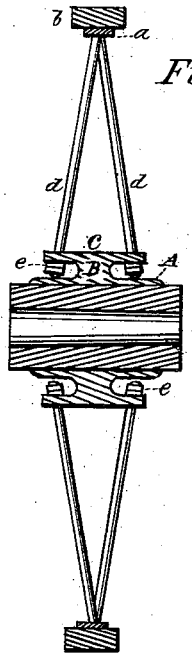
Figure 3:
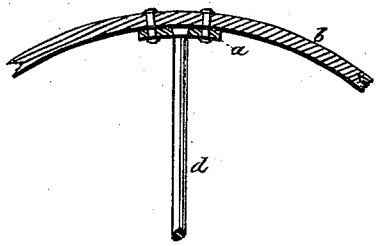
Figure 4:
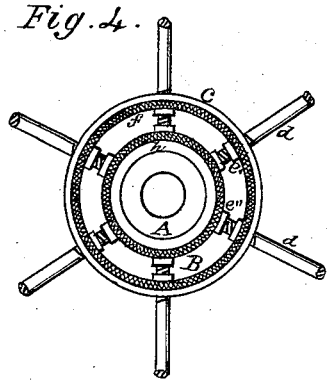

Figure 1 represents a perspective view of my newly-invented carriage-wheel; Fig. 2, a vertical section thereof; Fig. 3, a sectional portion of the tire and one spoke, exhibiting the mode of their attachment; Fig. 4, a front view of the hub and the inner ends of the several spokes.

The hub A in this case is made of a single piece of metal centrally located, on which is a circular flange, B, bearing at its outer extremity, and on each side thereof an overhanging circular rim, C, which is perforated or provided with holes corresponding to the number of spokes $d$ $d$, the inner ends of which are inserted in and through said holes, and each secured in place by means of nuts screwed thereon, their outer ends severally terminating in a short plate, $a$, riveted or bolted to the tire $b$, which makes a clean, substantial, light, and airy finish without the use of fellies.

The several spokes are to be made of steel or iron, and may be round, square, or any other shape found in practice most desirable, and may be arranged on the hub opposite each other or "staggered,"—that is, alternating so that every other spoke will set in the front part of the overhanging rim C, and between the two just behind it in the rear or back part of the circular rim. To give the necessary elasticity to the wheel, the several spokes pass through an elastic band, $f$, placed just inside of the circular rim C, and so that their ends shall rest upon another and similar elastic band, $h$, placed around the metallic portion of the hub A close to its central flange B. Each spoke is provided with two nuts, $e'$ $e''$, screwed thereon at that point and between the gum bands, one of which is forced tightly against the outer and the other against the inner elastic band, and so that the end thrust of the lower spokes will be received by the inner band, while the vertical pull of the uppermost spokes will be directly against the outer band $f$, which construction and arrangement of parts enables those spokes that come uppermost as the wheel revolves to take an equal portion of the load or weight.

I wish it understood that the hub may be provided with the usual pipe-box for the axle, together with a "point band," and any other appliance or appendage incident to such contrivances, and calculated to give it strength or add to its appearance, and to that end the hub may be provided with a thin metallic cover or shield, so constructed and applied as to effectually hide or cover the inside nuts and their immediate gum-elastic bands, and secured in place on the hub by any mode or means found in practice most effectual or convenient.

I claim—

1. The flange B, bearing at its periphery and outer extremity, and on each side thereof, an overhanging circular rim, C, perforated or provided with holes for the reception of the spokes $d$ $d$, in combination with the elastic band $f$ and nuts $e'$ $e''$, substantially in the manner shown, and for the purposes set forth.

2. The flange B, bearing at its periphery and outer extremity and on each side thereof, an overhanging circular rim, C, perforated or provided with holes for the reception of the alternating spokes $d$ $d$ arranged on each side of the circular rim C, in combination with the elastic band $h$ and nuts $e'$ $e''$, substantially in the manner shown, and for the purposes set forth.

3. The flange B, bearing at its periphery, and on each side thereof, an overhanging circular rim, C, perforated or provided with holes for the reception of the spokes $d$ $d$, in combination with the elastic bands $f$ and $h$ and nuts $e'$ $e''$, substantially in the manner shown, for the purposes set forth.

JOHN McGOWAN.

Witnesses:
JOSIAH W. ELLS,
ROBERT S. SILL.